United States Patent [19]
Kolar

[11] 3,782,703
[45] Jan. 1, 1974

[54] DEVICE FOR MASS AND HEAT TRANSFER
[75] Inventor: Vaclav Kolar, Prague, Czechoslovakia
[73] Assignee: Ceskoslovenska Akademie ved, Prague, Czechoslovakia
[22] Filed: Nov. 23, 1971
[21] Appl. No.: 201,307

Related U.S. Application Data
[63] Continuation-in-part of Ser. No. 149,244, June 2, 1971, abandoned.

[30] Foreign Application Priority Data
June 8, 1970 Czechoslovakia............... 4006/70

[52] U.S. Cl. .............................................. 261/112
[51] Int. Cl................................................. B01f 3/04
[58] Field of Search..................................... 261/112

[56] References Cited
UNITED STATES PATENTS
| | | | |
|---|---|---|---|
| 2,347,757 | 5/1944 | Thomas | 261/112 |
| 2,836,405 | 5/1958 | Hamon | 261/112 |
| 3,222,040 | 12/1965 | Eckert | 261/94 |
| 3,316,064 | 4/1967 | Kuzuoka et al. | 261/112 |
| 3,346,246 | 10/1967 | Loetel et al. | 261/112 |
| 3,496,996 | 2/1970 | Osdor | 261/112 |

FOREIGN PATENTS OR APPLICATIONS
| | | | |
|---|---|---|---|
| 681,019 | 10/1952 | Great Britain | 261/112 |
| 710,630 | 9/1941 | Germany | 261/112 |
| 427,087 | 4/1935 | Great Britain | 261/112 |
| 1,468 | 1/1909 | Great Britain | 261/112 |

Primary Examiner—Tim R. Miles
Attorney—Richard Low and Murray Schaffer

[57] ABSTRACT

Apparatus for transferring heat and/or mass in fluid to fluid contact apparatus wherein at least one fluid is liquid, comprising a housing in which a plurality of transfer sections are tandemly arranged. Each transfer section comprising a plurality of vertically disposed planar structures spaced from each other by spacers having projections forming gaps for flow of one fluid. The housing being spaced to provide for movement of the other fluid from between the planar structure of one to those of another.

9 Claims, 6 Drawing Figures

DEVICE FOR MASS AND HEAT TRANSFER

This is a continuation in part of U.S. application Ser. No. 149,244 filed June 1, 1971 now abandoned for which all legal and equitable rights and privileges are claimed.

BACKGROUND OF THE INVENTION

The present invention relates to a device for mass and heat transfer between two immiscible fluid phases of which at least one is a liquid.

Columns which contain a packing material represent one of the most widely used types of devices for mass and heat transfer between liquid and gaseous phases, such as for example, in rectification and absorption or between two immiscible liquid phases, such as for example liquid-liquid extraction. In devices of this type, intensive contact of the respective phases is accomplished by the fact that the liquid flows over the surface of the packing material which is of a suitable shape in order to produce the largest possible interphase surface. The most common type of packing material is a layer of a lumpy material which contains discrete particles of different sizes and shapes to form a sphere, a Raschig ring or a Berl saddle and the like. A disadvantage of this type of packing resides in the fact that it presents a considerably high resistance to the passage of phases and only a relatively small part of the entire surface of the packing is effective.

The first of the above mentioned drawbacks is eliminated in accordance with some device by a packing consisting of blocks of vertical plates disposed in parallel relationship and filling the entire device. The second of the above mentioned drawbacks cannot be removed at all, or at best only partly with hitherto used wetting methods. The liquid being processed which has to produce a continuous film on the vertical surfaces is supplied in the form of a spray on the upper edge of the packing so that individual drops or small liquid sources are created which do not form a continuous film on the vertical surfaces but usually a number of small streams which unite only accidentally into a continuous film. Moreover, conditions are such that they do not ensure, after a suitable time, homogenization of the liquid. Thus reduction of the concentration or temperature gradient and creation of a new interphase surface results.

It is a general object of the invention to eliminate the above mentioned drawbacks of known types of mass and heat transfer devices.

Another object of the invention is to provide a novel and improved device for mass and heat transfer between two immiscible fluid phases at least one of which is liquid by providing a contact column comprising sections of vertical or substantially vertical plates in combination with a liquid distributor.

Yet another specific object of the invention is to provide a device for mass and heat transfer of the above mentioned type wherein the bottom of the liquid distributor is formed by the upper edges of the plates and flat spacer strips, the latter being provided on both sides with projections which form slots or gaps for the passage of liquid.

Still another object of the invention is to provide a device of the above mentioned type in which the plates are made from expanded metal and in which substantially deflected ribs replace the projections of the spacing strips.

These objects together with numerous advantages will be apparent from the foregoing disclosure of the present invention.

SUMMARY OF THE INVENTION

According to the present invention mass and/or heat transfer apparatus is provided comprising a housing adapted to receive a primary fluid at one end and a counter flowing fluid at the other end. Stacked in a column within the housing are a plurality of heat or mass transfer sections each comprising a plurality of planar structures disposed vertically with respect to each other and having means for spacing them apart and for providing distributing passages for the primary fluid. The housing has an enlarged portion surrounding the juncture of adjacent transfer sections to form a partial chamber for movement of the counter flowing fluid from one section to another.

At least one of the fluids must be liquid, preferably this is the primary fluid, while the counter flow fluid may be vapor, gas, or liquid. The planar structures may be sheets or plate like members or may even be expanded metal sheets. The structures are provided with spacers having projections forming the passages between them.

Full details of the present invention follow in which reference is made to the accompanying drawings.

DESCRIPTION OF PREFERRED EMBODIMENT

Figure 1:
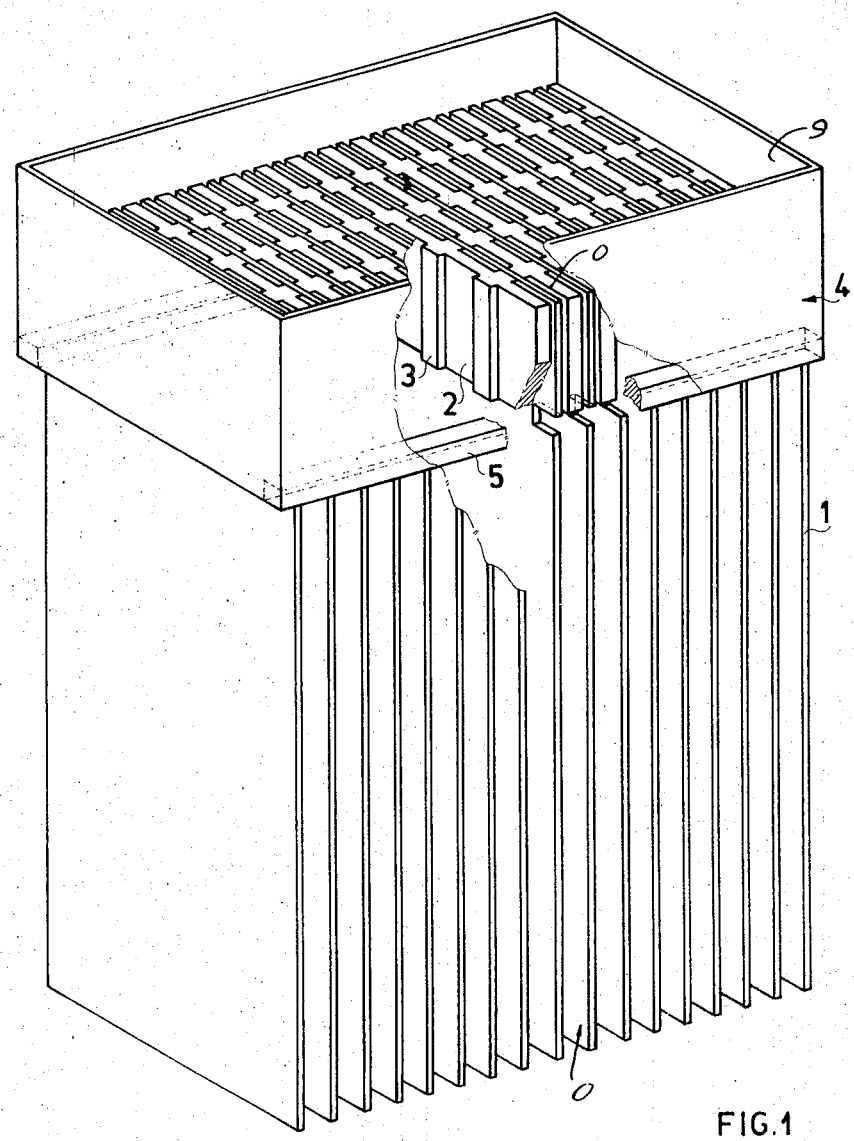
FIG. 1 represents an isometric view partially in section of one transfer section including planar structure and distributor of liquid.

Referring now more particularly to FIG. 1 there will be seen a subassembly comprising a plurality of vertically disposed planar structures 1 forming the individual transfer sections of a fluid contact apparatus. The planar structures are separated at their upper ends by spacing strips 2 each of which is provided with laterally extending projections 3 forming fluid distributing openings 0 along the sides of the plates 1. The upper edges of the planar structures 1 and the spacing strips 2 are horizontally coplanar and form the bottom of a distributor section enclosed by a trough or vessel 4 formed by peripheral sides 9. Opposed sides of the trough 4 are provided with runners or slats 5 for supporting and suspending the underside of the sub-assembly of planar structures 1 and spacing strips 2 in vertical spaced arrangement.

The trough or vessel and the supporting slats 5 are arranged so as to bind the assembly of planar structures and spacers, tightly an unitarily together, so that the assembly is rigid and permits flow of fluid only through the gaps 0 formed by the projections 3.

Figure 2:
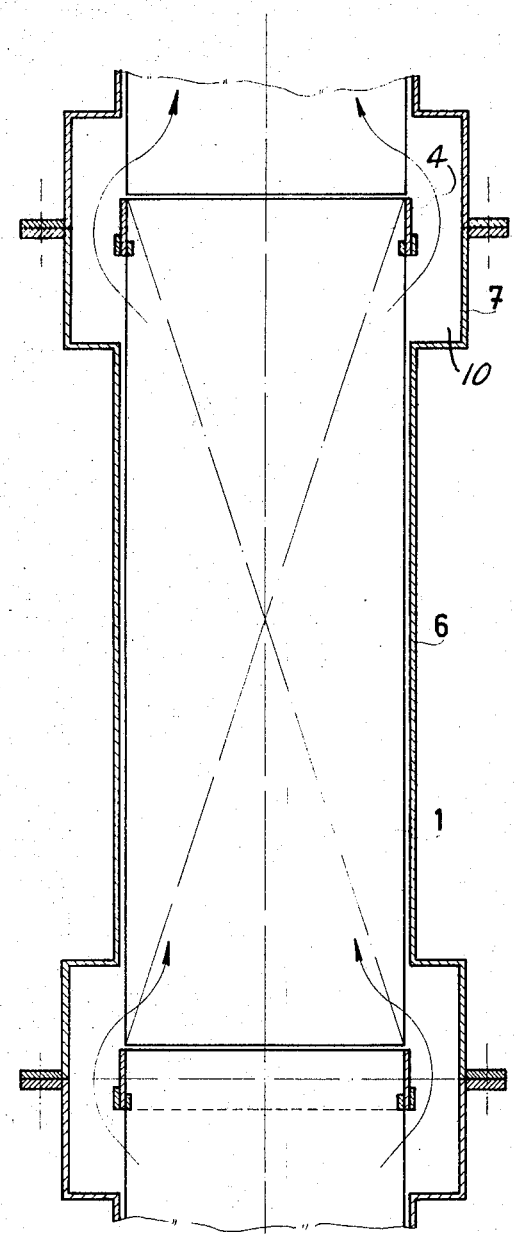
FIG. 2 is a schematic illustration of the flow of gas through a device employing the transfer sections according to FIG. 1.

As seen schematically in FIG. 2 a plurality of the sub-assemblies are vertically arranged in tandem or stacked relationship in a housing 6, itself formed of a number of vertical sections having enlarged portions 7 at each end. The enlarged or widened portions 7 abut against each other, and are sealed by extended flanges so as to form a pass chamber 10 partially surrounding the junction of the distributor sections and on the one hand the upper edges of the plate structures 1 and on the other hand the bottommost edges of the plate structures of each adjacent sub-assembly. The sections of the housing 6 are joined together at their flanged ends by conventional means. Means for providing a primary fluid, for example at the upper end and a counter flowing gas or fluid at the lower end are also provided in conventional manner, although not shown.

Figure 3:
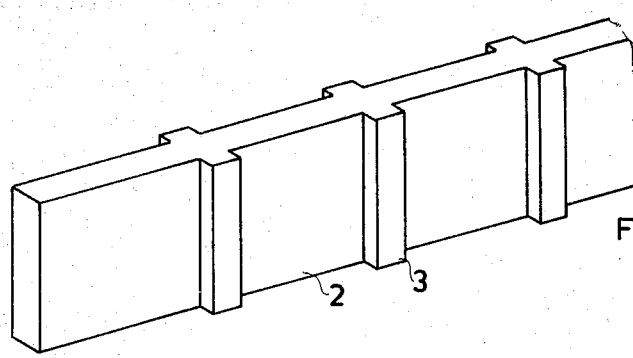
FIG. 3 shows one embodiment of spacing strips.
Figure 4:
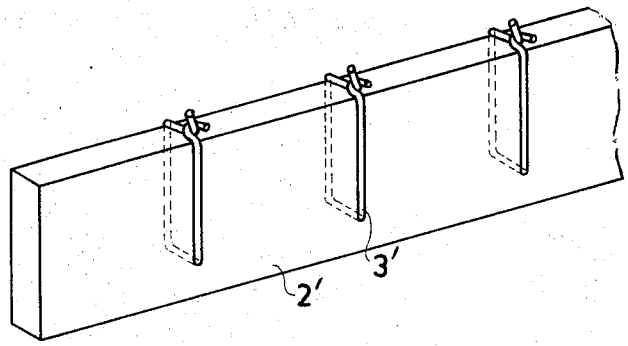
FIG. 4 shows another embodiment of spacing strips.

FIGS. 3 and 4 show spacing strips 2 provided with various projections 3. The projections seen in FIG. 3 are those shown in FIG. 1 and comprise a plurality of parallel vertical ribs integrally formed in uniform spaced relationship on both sides of the spacers. Thus a single spacer can provide distributing openings or gaps 0 on either side between adjacent projections. In FIG. 4, the projections comprise wire like members 3' wound through an elongated rectangular spacer member 2' and knotted or twisted into place in uniform spaced relationship. This also provides the necessary projection to provide distributing openings 0.

Figure 5:
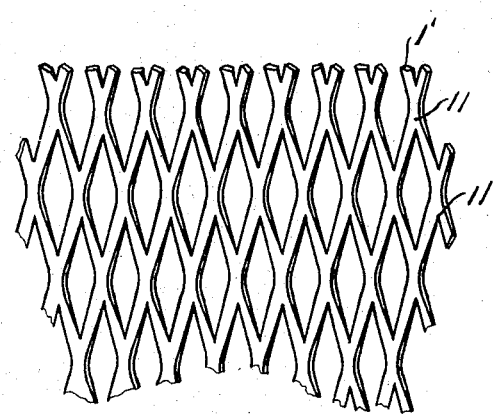
FIG. 5 is a schematic illustration of expanded metal employed in the practice of the invention.

In FIG. 5 an alternate form of plate structure is shown which comprises a structure formed of expanded metal having a lattice work rib configuration. The exact lattice configuration is not critical and while the diamond shape is shown, others may be used. At least some of the lattice ribs are deflected spatially out of the plane of the expanded metal, as seen in the twist of portions 11 so that even though the upper edges of the structure 1' may be squeezed between the spacers 2 the fluid may be caused to run in twisted contortions down the lattice work. In the use of a lattice plate structure the projections 3 may be reduced in size or eliminated, since the open lattice will provide sufficient gap space.

Figure 6:
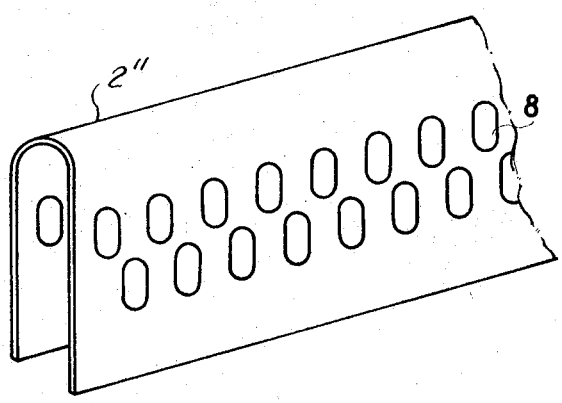
FIG. 6 illustrates another embodiment of spacing strips.

FIG. 6 shows another alternative construction for spacing strips 2'' in which openings 8 are provided. The openings serve as passages bringing one of the two phases above the level of liquid in the distributor. If this construction is used then the widened part 7 of the container 6 may no longer be necessary.

In operation a primary liquid is delivered into the trough or vessel 4 of the uppermost sub-assembly of the assembled contact apparatus seen in FIG. 2. The liquid is passed through the gaps 0 formed between the plates 1 and spacers 2 and descends in a uniform distribution onto the plates 1. The arrangement of the plate and spacers creates an effective distribution of the liquid, forming a thin cohesive film on the surfaces of the plate structure 1. Meanwhile a counter-flow of fluid, such as gas, vapor, or liquid itself which is immiscible with the primary liquid is delivered and caused to ascend upwardly in contact with the primary liquid. The counter-flow liquid by passes the distributor section by taking the path shown by the arrows through the widened or enlarged section 7. During passage of the primary fluid through the housing, in contact with the counter-flow fluid, the required and desired transfer of heat and/or mass occurs.

The arrangements described permit building in of a considerable interphase surface which readily lends itself to substantially perfect use for mass or heat transfer as described earlier. If expanded metal is used as the plate, there occurs interrupted mixing of the liquid in the film as it descends and thus renovation of the interphase surface and increase of the driving force for mass or heat transfer occurs.

The arrangement of the inserted structure in a column of circular cross section is analogous and obvious in view of the above disclosure.

It will be seen that the present device provides a liquid distributor arranged above each section of the transfer structures. This serves to subject the descending fluid to repeated homogenization and mixing. It also serves to balance concentration and temperature gradients.

The provision of projections on the alternating spacer strips in the form of ribs or wires arranged in the direction of flow of the liquid enhance fluid flow. They also provide means for clamping the sub-assembly together in a tight unit with the fluid passages selectively dimensioned to obtain a desired or predetermined flow rate.

Another feature of the invention lies in the fact that the distributor of the device is a vessel, the bottom of which is formed by the upper edges of the plates and by flat spacer strips, so that the fluid descending from one section to another collects in the vessel and is redistributed more uniformly.

An important advantage of the invention resides in the fact that there is created on the sheet like plates a continuous film of the liquid or on the expanded structure a number of small sources or streams which necessarily unite into a continuous film after passing through the outlets or gaps in the distributors at the upper end of each transfer section.

When the liquid film flows down over a path formed by the length of the plates it either flows away from the device, or into another distributor disposed in a lower position. In each distributor, homogenization of the liquid and balancing of concentration and temperature gradients occurs and a new interphase surface is produced at the outlet of the passages. At lower wetting densities of fluid it is at first desirable to increase the wetting density whereby perfect wetting of the surface is achieved, and this interphase state is maintained even if the wetting density is reduced.

Experiments have shown that even a thin layer of the liquid leads to a substantial increase in the coefficient of mass or heat transfer, if by suitable arrangement of the surface of the transfer plate structures (roughness, perforation, and the like) or mechanical stirring good mixing of the liquid in the layer is achieved as it flows over the inserted structure, and thus a reduction in the concentration or temperature on the interphase surface results. This increases the concentration or temperature gradient, and therefore also the driving force of the process.

Experiments have also shown that expanded metal is an eminently suitable material for achieving the above mentioned turbulence of the liquid layer.

Table 1 shows values of the coefficient of mass transfer in m/s (per 1 $m^2$ of inserted structure) measured on a device with different types of packing in a water carbon dioxide system. The plates were 100 mm wide and 750 mm long and they were wetted on both sides.

TABLE I

| Type of packing | Rate of flow of water 1 l/min | | | |
|---|---|---|---|---|
| Time | 0.1 | 0.5 | 1.0 | 5.0 |
| Smooth plate | — | $6.4 \times 10^{-5}$ | $9.0 \times 10^{-5}$ | $1.5 \times 10^{-4}$ |
| Perforated metal sheet dia. 8mm | — | $1.7 \times 10^{-4}$ | $3.0 \times 10^{-4}$ | $8.0 \times 10^{-4}$ |
| Perforated metal sheet dia. 4×4 mm | $4.0 \times 10^{-5}$ | $2.0 \times 10^{-4}$ | $2.9 \times 10^{-4}$ | $5.3 \times 10^{-4}$ |
| Perforated metal sheet dia. 6.75×6.75 mm | — | $1.0 \times 10^{-4}$ | $2.2 \times 10^{-4}$ | $5.4 \times 10^{-4}$ |
| Expanded metal 16×4 mm | $5.0 \times 10^{-5}$ | $2.2 \times 10^{-4}$ | $3.6 \times 10^{-4}$ | $9.0 \times 10^{-4}$ |
| Expanded metal 15×5 mm | $4.2 \times 10^{-5}$ | $2.4 \times 10^{-4}$ | $3.6 \times 10^{-4}$ | $1.2 \times 10^{-3}$ |

It is obvious from the above mentioned table that the coefficient of mass transfer is, under otherwise similar conditions up to eight times larger for expanded metal than with a smooth plate, and, on an average, about 30 percent larger than with perforated surfaces having circular holes which appear to be the most effective among perforated metal sheets.

Moreover, in addition to an increased efficiency the use of expanded metal as a packing has another advantage in comparison with perforated metal sheets. This advantage arises from the fact that no material waste occurs in production. On the contrary, an areal unit of the metal sheet yields a multiple of the area of expanded metal. In view of the fact that in production spatial deflection of the ribs occurs thinner metal sheets may be chosen for production without endangering the stability of the packing. Spatial deflection of the ribs makes possible a more perfext mixing of the liquid film than plane bridges in perforated sheet metals. Best results were obtained with an arrangement where the liquid flowed in the direction of cut of the sheet.

It will thus be observed that various modifications and changes are permissible without departure from the scope of the present invention. Accordingly the present disclosure is to be taken as illustrative only and not limiting of the invention.

What is claimed is:

1. Apparatus for the mass or heat transfer between fluid phases comprising
   a. a vertical housing adapted to receive a primary fluid at its upper end for downward flow and a secondary fluid at is lower end for flow upwardly counter to said primary fluid,
   b. a plurality of transfer sections arranged adjacent each other in tandem within said housing, each of said transfer sections comprising
      1. a plurality of vertically disposed substantially planar structures
      2. spacer means located between said structures along one edge thereof for separating said planar structures from each other providing distributing passages for flow of primary fluid thereover,
   c. said housing having an enlarged portion surrounding the juncture of adjacent transfer sections with said spacer means and forming a chamber for movement of said counter flow fluid about said spacer means from the structures of one section to the structures of the adjacent section, said spacer means defining with said structures vertical openings along the faces of said structures.

2. Apparatus according to claim 1 wherein said spacing means comprise an elongated strip interposed between adjacent planar structures and having laterally extending projections forming fluid passages between said structures and said strips.

3. Apparatus according to claim 2 wherein said strips are arranged to have their upper edges substantially horizontally planar therewith, and including peripheral primary fluid enclosing means whereby said fluid may be distributed through said passages from the structures of one section to the structures of another section.

4. The apparatus according to claim 2 wherein said projections comprise vertical ribs integrally formed on said spacer strips and uniformly disposed along the length thereof.

5. The apparatus according to claim 4 wherein said projections comprise wire sections secured through said spacer strips and arranged uniformly spaced in a vertical direction along the length of said strip.

6. The apparatus according to claim 1 wherein said spacing means comprises an elongated U shaped member having a plurality of holes formed along its length.

7. The apparatus according to claim 1 wherein said planar structures comprise plate like sheets.

8. The apparatus according to claim 1 wherein said planar structures comprise a sheet of expanded metal having a latice work of inter connected ribs.

9. The apparatus according to claim 8 wherein at least some of the ribs of said expanded metal sheet are deflected spacially out of the plane of said sheet.

* * * * *